US012039934B2

(12) United States Patent
Komazawa et al.

(10) Patent No.: US 12,039,934 B2
(45) Date of Patent: Jul. 16, 2024

(54) LIGHT EMITTING DEVICE, DISPLAY DEVICE, PHOTOELECTRIC CONVERSION DEVICE, ELECTRONIC APPARATUS, ILLUMINATION DEVICE, AND MOVING BODY

(71) Applicant: CANON KABUSHIKI KAISHA, Tokyo (JP)

(72) Inventors: Akihito Komazawa, Kanagawa (JP); Hiromasa Tsuboi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/299,145

(22) Filed: Apr. 12, 2023

(65) Prior Publication Data

US 2023/0343292 A1 Oct. 26, 2023

(30) Foreign Application Priority Data

Apr. 21, 2022 (JP) ................................ 2022-070269

(51) Int. Cl.
*G09G 5/00* (2006.01)
*G09G 3/3233* (2016.01)

(52) U.S. Cl.
CPC ... *G09G 3/3233* (2013.01); *G09G 2320/0626* (2013.01)

(58) Field of Classification Search
None
See application file for complete search history.

(56) References Cited

U.S. PATENT DOCUMENTS

| | | | | |
|---|---|---|---|---|
| 9,041,628 | B2 | 5/2015 | Yamashita | |
| 9,640,111 | B2 | 5/2017 | Yamashita | |
| 9,972,244 | B2 | 5/2018 | Yamashita | |
| 10,818,232 | B2 | 10/2020 | Tsuboi | |
| 10,867,561 | B2 | 12/2020 | Ota | |
| 10,885,837 | B2 | 1/2021 | Yamashita | |
| 10,998,392 | B2 | 5/2021 | Tsuboi | |
| 11,087,680 | B2 | 8/2021 | Tsuboi | |
| 11,282,453 | B2 | 3/2022 | Tsuboi | |
| 11,393,430 | B2 | 7/2022 | Nagasaki | |
| 11,495,656 | B2 | 11/2022 | Akiyama | |
| 11,527,591 | B2 | 12/2022 | Tsuboi | |
| 2010/0271349 | A1* | 10/2010 | Liu | H01L 27/1251 438/22 |
| 2011/0006376 | A1 | 1/2011 | Fukushima | |
| 2013/0050067 | A1 | 2/2013 | Yamashita | |

(Continued)

FOREIGN PATENT DOCUMENTS

| | | |
|---|---|---|
| JP | 2011-108673 A | 6/2011 |
| JP | 2013-044890 A | 3/2013 |
| JP | 2020-064265 A | 4/2020 |

*Primary Examiner* — Carl Adams
(74) *Attorney, Agent, or Firm* — Venable LLP

(57) ABSTRACT

A light emitting device in which a pixel is arranged is provided. The pixel includes a light emitting element, a first transistor configured to supply, to the light emitting element, a current corresponding to a luminance signal, and a second transistor configured to supply the luminance signal to a gate electrode of the first transistor. Diffusion regions respectively functioning as a source region and a drain region of the second transistor are of a first conductivity type, and a gate electrode of the second transistor is of a second conductivity type opposite to the first conductivity type.

31 Claims, 17 Drawing Sheets

(56) References Cited

U.S. PATENT DOCUMENTS

| | | | |
|---|---|---|---|
| 2015/0235592 | A1 | 8/2015 | Yamashita |
| 2017/0148386 | A1 | 5/2017 | Yamashita |
| 2018/0114775 | A1* | 4/2018 | Ray ........................ H01L 27/15 |
| 2018/0261156 | A1 | 9/2018 | Yamashita |
| 2020/0126481 | A1 | 4/2020 | Tsuboi |
| 2022/0223120 | A1 | 7/2022 | Tsuboi |
| 2022/0230585 | A1 | 7/2022 | Komazawa |
| 2023/0043411 | A1 | 2/2023 | Igarashi |
| 2023/0061540 | A1 | 3/2023 | Nagasaki |
| 2023/0071385 | A1 | 3/2023 | Tsuboi |

* cited by examiner

LIGHT EMITTING DEVICE, DISPLAY DEVICE, PHOTOELECTRIC CONVERSION DEVICE, ELECTRONIC APPARATUS, ILLUMINATION DEVICE, AND MOVING BODY

BACKGROUND OF THE INVENTION

Field of the Invention

The present invention relates to a light emitting device, a display device, a photoelectric conversion device, an electronic apparatus, an illumination device, and a moving body.

Description of the Related Art

There is known a light emitting device using a self-light emitting element such as an organic electroluminescence (EL) element. Japanese Patent Laid-Open No. 2020-064265 describes a display device provided with pixels each including a driving transistor configured to supply, to a light emitting element, a current corresponding to a luminance signal, and a write transistor configured to supply the luminance signal to the driving transistor.

SUMMARY OF THE INVENTION

If a luminance signal supplied to a driving transistor changes due to an off-leakage current of a write transistor, the light emission luminance of a light emitting element also changes, resulting in deterioration of the image quality of a light emitting device. To improve display quality, it is necessary to suppress the off-leakage current of the write transistor.

Some embodiments of the present invention provide a technique advantageous in improving display quality.

According to some embodiments, a light emitting device in which a pixel comprising a light emitting element, a first transistor configured to supply, to the light emitting element, a current corresponding to a luminance signal, and a second transistor configured to supply the luminance signal to a gate electrode of the first transistor is arranged, wherein diffusion regions respectively functioning as a source region and a drain region of the second transistor are of a first conductivity type, and a gate electrode of the second transistor is of a second conductivity type opposite to the first conductivity type, is provided.

Further features of the present invention will become apparent from the following description of exemplary embodiments (with reference to the attached drawings).

DESCRIPTION OF THE EMBODIMENTS

Figure 1:
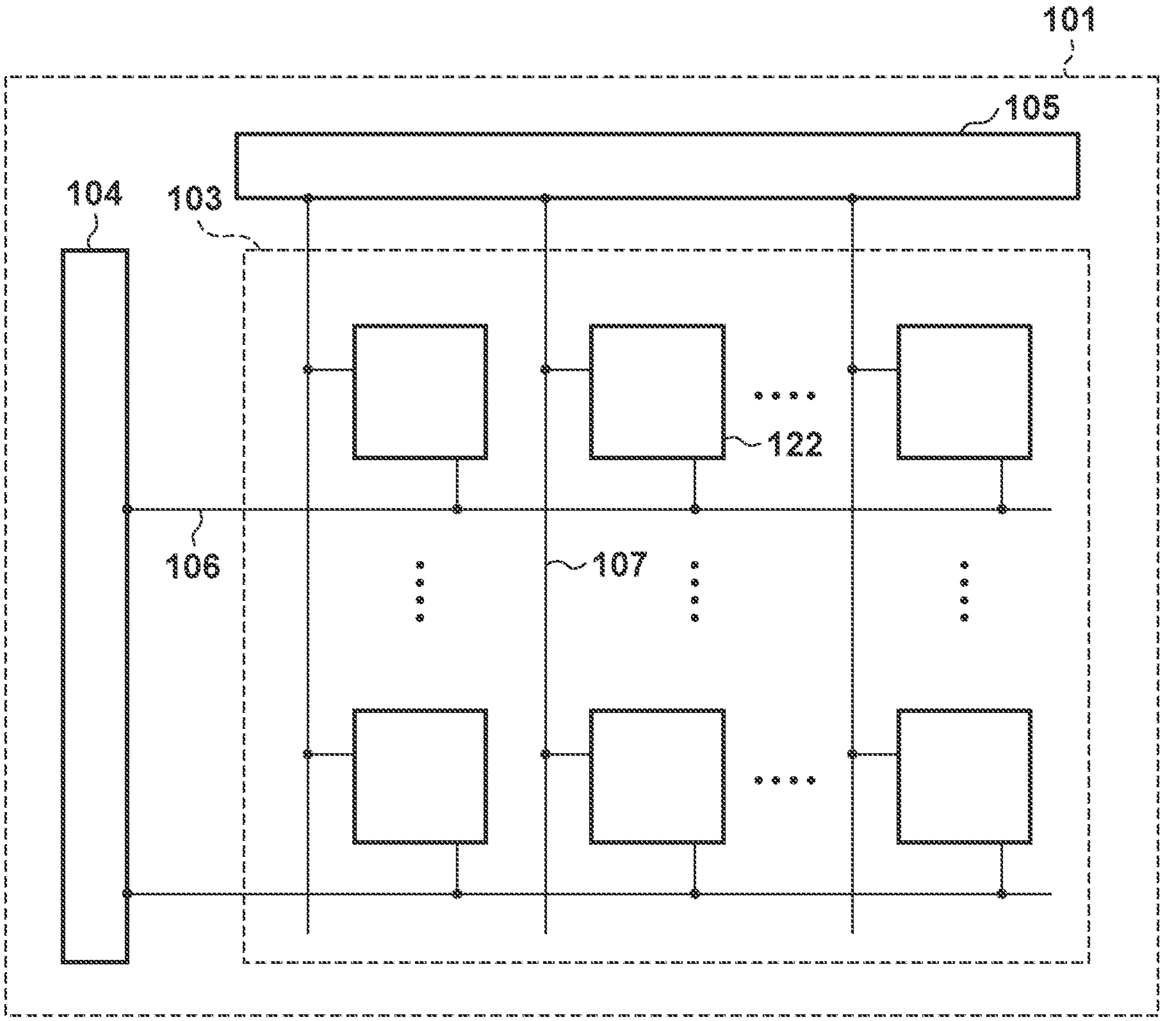
FIG. 1 is a view showing an example of the arrangement of a light emitting device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 2:
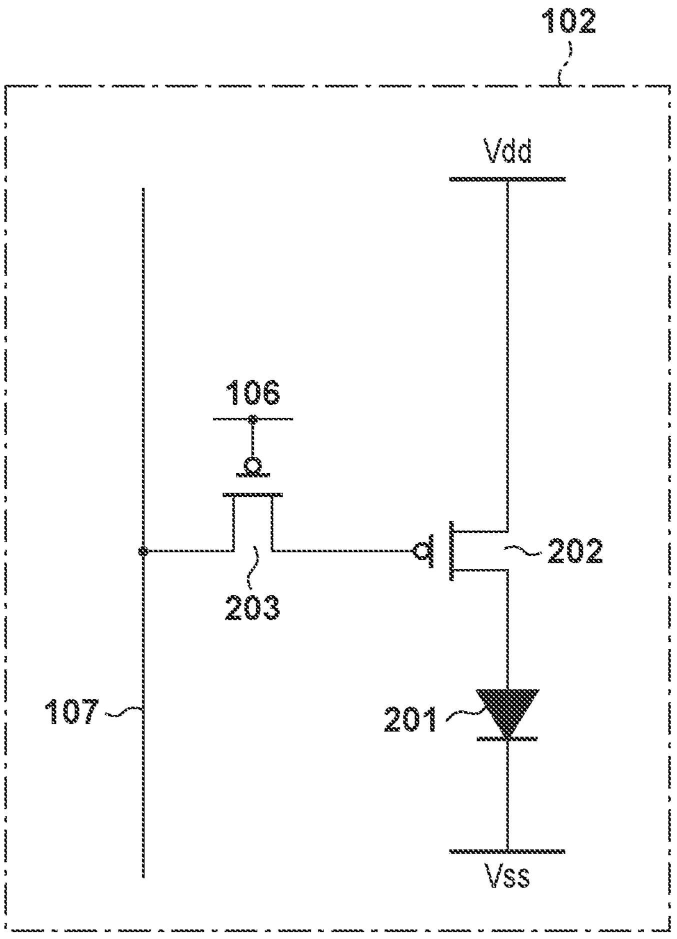
FIG. 2 is a circuit diagram showing an example of the arrangement of a pixel of the light emitting device shown in FIG. 1.

A light emitting device according to an embodiment of the present invention will be described with reference to FIGS. 1 to 12. FIG. 1 is a schematic view showing an example of the arrangement of a light emitting device 101 according to this embodiment. FIG. 2 is a circuit diagram showing an example of the arrangement of a pixel 102 arranged in the light emitting device 101.

A case will be described below in which a driving transistor 202 is connected to the anode of a light emitting element 201 arranged in each pixel 102 of the light emitting device 101 and all transistors arranged in the pixel 102 are p-type transistors. However, the arrangement of the pixel 102 of the light emitting device 101 is not limited to this. For example, the polarities or conductivity types of the respective transistors and the like may all be reversed. Alternatively, for example, the driving transistor may be a p-type transistor and the remaining transistors may be n-type transistors. Potentials to be supplied and connections are changed appropriately in accordance with the polarities or conductive types of the light emitting element and the transistors included in the pixel 102 of the light emitting device 101.

In this embodiment, as shown in FIG. 1, the light emitting device 101 includes a pixel array 103 and a driving circuit arranged on the periphery of the pixel array 103. The pixel array 103 includes the plurality of pixels 102 arranged in an array. Each pixel 102 includes the light emitting element 201. The light emitting element 201 includes, for example, an anode and a cathode, and includes an organic layer including a light emitting layer between the anode and the cathode. In addition to the light emitting layer, the organic layer may appropriately include one or more of a hole injection layer, a hole transport layer, an electron injection layer, and an electron transport layer. In other words, the light emitting element 201 may be an Organic Electroluminescent (EL) element.

The driving circuit is a circuit configured to drive the pixels 102 arranged in the pixel array 103. The driving circuit includes, for example, a vertical scanning circuit 104 and a signal output circuit 105. To supply a signal from the driving circuit to the pixel 102, a scanning line 106 extending in a row direction (the horizontal direction in FIG. 1) is arranged in the pixel array 103 for each pixel row of the pixels 102 arranged in an array. In addition, a signal line 107 extending in a column direction (the vertical direction in FIG. 1) is arranged in the pixel array 103 for each pixel column of the pixels 102 arranged in an array.

Each scanning line 106 is connected to an output terminal of a corresponding pixel row of the vertical scanning circuit 104. Each signal line 107 is connected to an output terminal of a corresponding pixel column of the signal output circuit 105.

At the time of writing a video signal in each pixel 102 of the pixel array 103, the vertical scanning circuit 104 supplies a write control signal to each scanning line 106.

The signal output circuit 105 appropriately selects one of a reference voltage signal having a reference voltage and a luminance signal having a voltage corresponding to luminance information at the time of causing the light emitting element 201 of each pixel 102 to emit light, and outputs the selected signal to each signal line 107. The luminance signal represents luminance at each pixel 102 of an image displayed by the light emitting device 101, and can also be called a video signal.

The pixel 102 according to this embodiment shown in FIG. 2 includes the light emitting element 201, the driving transistor 202 for supplying, to the light emitting element 201, a current corresponding to the luminance signal, and a write transistor 203 for supplying the luminance signal to the gate electrode of the driving transistor. The total number of transistors and a combination of the conductivity types of the transistors are merely examples, and the present invention is not limited to them.

In this embodiment, one end of a current path including the light emitting element 201 and the driving transistor 202 is connected to a power supply potential Vss, and the other end is connected to a power supply potential Vdd. More specifically, the cathode of the light emitting element 201 is connected to the power supply potential Vss, and one (the source region in the arrangement shown in FIG. 2) of diffusion regions respectively functioning as the source region and the drain region of the driving transistor 202 is connected to the power supply potential Vdd. However, the present invention is not limited to this, and another element may be arranged between the power supply potential Vss and the light emitting element 201 or between the power supply potential Vdd and the driving transistor 202. Furthermore, another element may be arranged between the light emitting element 201 and the driving transistor 202. In the arrangement shown in FIG. 2, the power supply potential Vdd is higher than the power supply potential Vss.

The other (the drain region in the arrangement shown in FIG. 2) of the diffusion regions respectively functioning as the source region and the drain region of the driving transistor 202 is connected to the anode of the light emitting element 201. The gate electrode of the driving transistor 202 is connected to one (the drain region in the arrangement shown in FIG. 2) of diffusion regions respectively functioning as the source region and the drain region of the write transistor 203.

The write transistor 203 is arranged between the signal line 107 and the gate electrode of the driving transistor 202. More specifically, one of the diffusion regions respectively functioning as the source region and the drain region of the write transistor 203 is connected to the gate electrode of the driving transistor 202, as described above, and the other of the diffusion regions respectively functioning as the source region and the drain region of the write transistor 203 is connected to the signal line 107. Furthermore, the gate electrode of the write transistor 203 is connected to the scanning line 106.

The driving transistor 202 supplies a current from the power supply potential Vdd to the light emitting element 201, thereby causing the light emitting element 201 to emit light. More specifically, the driving transistor 202 supplies a current corresponding to the signal voltage of the signal line 107 to the light emitting element 201. Therefore, the driving transistor 202 current-drives the light emitting element 201 to emit light.

The write transistor 203 is set in the conductive state in response to a write control signal applied from the vertical scanning circuit 104 to the gate electrode via the scanning line 106. Thus, the write transistor 203 samples the reference voltage or the signal voltage of the luminance signal corresponding to the luminance information supplied from the signal output circuit 105 via the signal line 107, and writes it in the pixel 102. The written signal voltage or reference voltage is applied to the gate electrode of the driving transistor 202. That is, the write transistor 203 is arranged to transmit the luminance signal for causing the light emitting element 201 to emit light with luminance corresponding to the luminance information, and transmits the luminance signal to the gate electrode of the driving transistor 202.

An organic EL element can be used as the light emitting element 201. At the time of light emission of the light emitting element 201, the amount of a current flowing through the driving transistor 202 changes in accordance with the signal voltage applied from the signal line 107 to the gate electrode of the driving transistor 202 via the write transistor 203. This charges the capacitance between the anode and the cathode of the light emitting element 201 to a predetermined potential, and a current corresponding to the potential difference flows. Thus, the light emitting element 201 emits light with predetermined luminance.

Figure 3:
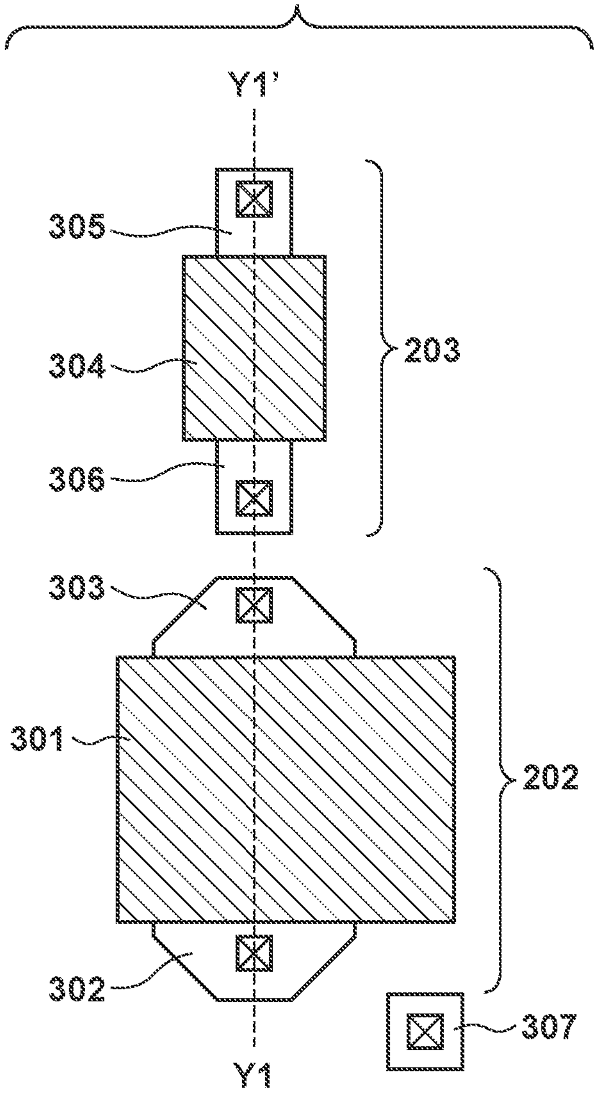
FIG. 3 is a plan view showing the example of the arrangement of the pixel of the light emitting device shown in FIG. 1.
Figure 4:
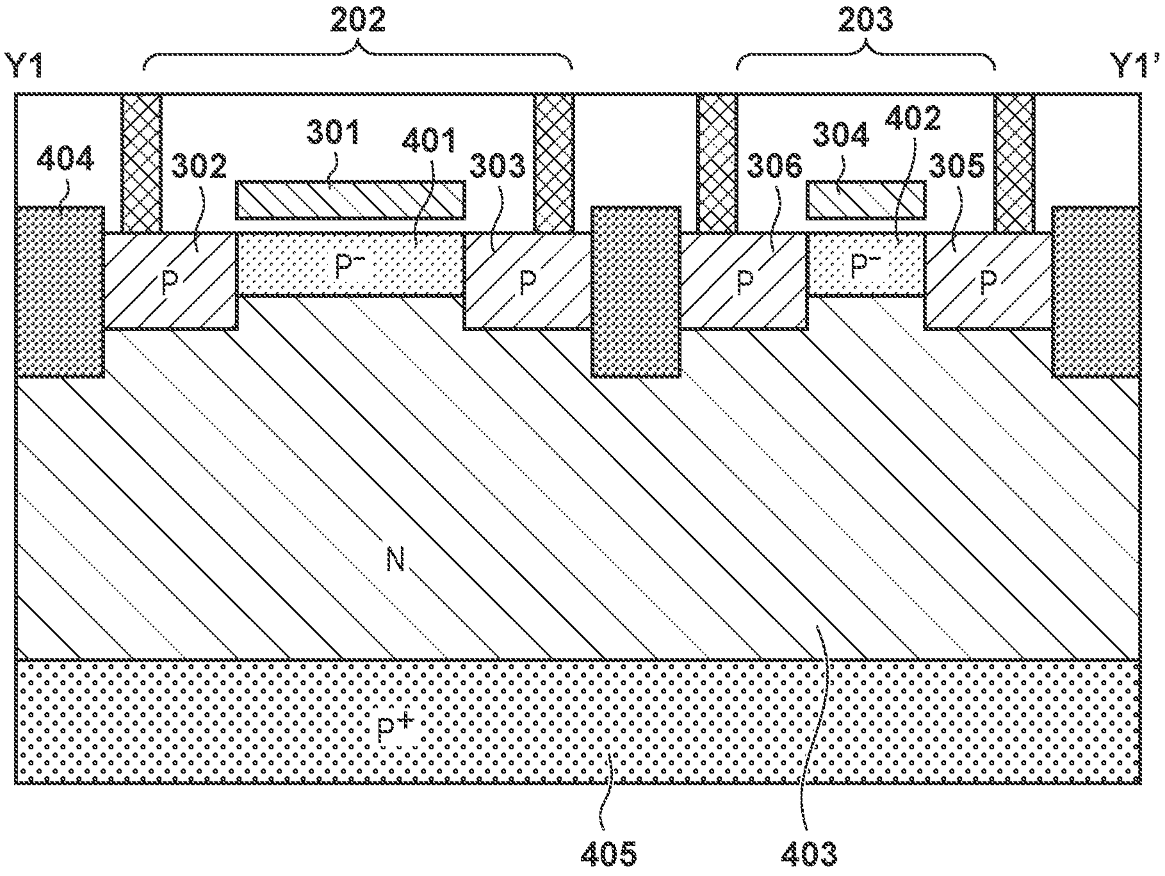
FIG. 4 is a sectional view showing the example of the arrangement of the pixel of the light emitting device shown in FIG. 1.

The driving transistor 202 and the write transistor 203 included in the pixel 102 will be described in detail next with reference to FIGS. 3 and 4. FIG. 3 is a plan view showing the outline of the pixel 102, and FIG. 4 is a sectional view taken along a line Y1-Y1' shown in FIG. 3.

The driving transistor 202 includes two p-type diffusion regions 302 and 303 respectively functioning as the source region and the drain region arranged in the current path including the light emitting element 201. The driving transistor 202 includes a gate electrode 301. As described above, the luminance signal is transmitted from the write transistor 203 to the gate electrode 301.

In this embodiment, the conductivity type of the gate electrode 301 of the driving transistor 202 as a p-type transistor is an n type, which has a polarity opposite to those of the p-type diffusion regions 302 and 303. By using the n-type gate electrode 301 with respect to the p-type diffusion regions 302 and 303, it is possible to increase the threshold voltage of the difference in the work function, and suppress the off-leakage current of the driving transistor 202. If the off-leakage current of the driving transistor 202 is suppressed, deeper black display can be implemented, thereby obtaining high contrast.

The write transistor 203 includes a gate electrode 304 and p-type diffusion regions 305 and 306 respectively functioning as the source region and the drain region. The diffusion region 306 is connected to the gate electrode 301 of the driving transistor 202. The diffusion region 305 is connected to the signal line 107, and the gate electrode 304 is connected to the scanning line 106.

In this embodiment, the conductivity type of the gate electrode 304 of the write transistor 203 as a p-type transistor is an n type, which has a polarity opposite to those of the p-type diffusion regions 305 and 306. By using the n-type gate electrode 304 with respect to the p-type diffusion regions 305 and 306, it is possible to increase the threshold voltage of the difference in the work function, and suppress the off-leakage current of the write transistor 203. If the off-leakage current of the write transistor 203 is suppressed, the signal voltage of the luminance signal written in the gate electrode 301 of the driving transistor 202 during a light emission period can be kept more constant. As a result, it is possible to suppress a luminance change of the light emitting element 201, thereby implementing high-quality display.

In this embodiment, the driving transistor 202 and the write transistor 203 are arranged in an n-type well 403 provided on a p-type substrate 405. A well contact 307 applies the power supply potential Vdd to the n-type well 403. For an element isolation portion 404, an appropriate structure such as shallow trench isolation (STI), local oxidation of silicon (LOCOS) isolation, or n-type diffusion layer isolation is used.

The present inventor has examined the light emitting device 101 having the above-described arrangement, and has found the following problem. In a process of forming the channel region of the write transistor 203, the characteristic distribution of the threshold voltage and the channel density of the write transistor 203 is generated in accordance with the distribution of the injection amount of impurity ions. Thus, the off-leakage current of the write transistor 203 is not stabilized, and the signal voltage of the gate electrode 301 of the driving transistor 202 during the light emission period changes for each pixel 102 to change the amount of a current supplied to the light emitting element 201, thereby causing display unevenness.

To solve this problem, the channel region 402 of the write transistor 203 may be a p-type or n-type diffusion layer, but it is effective to suppress the impurity concentration to be as low as possible. This suppresses the variations of the channel density, the threshold voltage, and the off-leakage current of the write transistor 203, thereby suppressing the change of the signal voltage of the gate electrode 301 of the driving transistor 202 for each pixel 102 during the light emission period. Thus, the variation of the amount of the current supplied to the light emitting element 201 is suppressed. That is, as the impurity concentration of the channel region 402 of the write transistor 203 is closer to "0", the variation of the amount of the current supplied to the light emitting element can be suppressed more.

For example, the impurity concentration of a channel region 402 of the write transistor 203 may be lower than that of the well 403. For example, the impurity concentration of the channel region 402 of the write transistor 203 may be substantially equal to that of a channel region 401 of the driving transistor 202. Similarly, for example, the impurity concentration of the channel region 402 of the write transistor 203 may be substantially equal to that of a channel region of a transistor in the circuit of the driving circuit (for example, the vertical scanning circuit 104 and the signal output circuit 105) arranged on the periphery of the pixel array 103. This eliminates the need to increase the number of processes when forming each of the channel regions of the write transistor 203, the driving transistor 202, and the transistor in the circuit of the driving circuit arranged on the periphery of the pixel array 103. In this specification, the impurity concentration can indicate the concentration based on the number of carriers decided based on the difference between the number of holes and the number of electrons in each region functioning as a p type or n type.

Furthermore, as shown in FIG. 4, the channel region 402 of the write transistor 203 may be a p-type buried channel. By forming the channel region 402 as a p-type buried channel, it is possible to suppress a fluctuation of a current caused by Random Telegraph Signal (RTS) noise of the write transistor 203. In this case as well, the impurity concentration of the channel region 402 of the write transistor 203 may be lower than that of the well 403. For example, the impurity concentration of the channel region 402 of the write transistor 203 may be substantially equal to the impurity concentration of the channel region 401 of the driving transistor 202 and the impurity concentration of the channel region of the transistor in the circuit of the driving circuit arranged on the periphery of the pixel array 103.

Similarly, as shown in FIG. 4, the channel region 401 of the driving transistor 202 may be a p-type buried channel. By forming the channel region 401 as a p-type buried channel, it is possible to suppress a fluctuation of a current caused by RTS noise of the driving transistor 202.

As described above, by using the n-type gate electrode 304 in the write transistor 203 which is a p-type transistor, the off-leakage current of the write transistor 203 is suppressed. Thus, the signal voltage of the luminance signal written in the gate electrode 301 of the driving transistor 202 during the light emission period can be kept more constant. As a result, it is possible to suppress a luminance change of the light emitting element 201, thereby implementing high-quality display in the light emitting device 101.

By setting the impurity concentration of the channel region 402 of the write transistor 203 low, the variations of the channel density, the threshold voltage, and the off-leakage current of the write transistor 203 are suppressed. Therefore, the change of the signal voltage of the gate electrode 301 of the driving transistor 202 for each pixel 102 during the light emission period can be suppressed, thereby suppressing display unevenness in the light emitting device 101. As a result, it is possible to implement high-quality display in the light emitting device 101.

Figure 5:
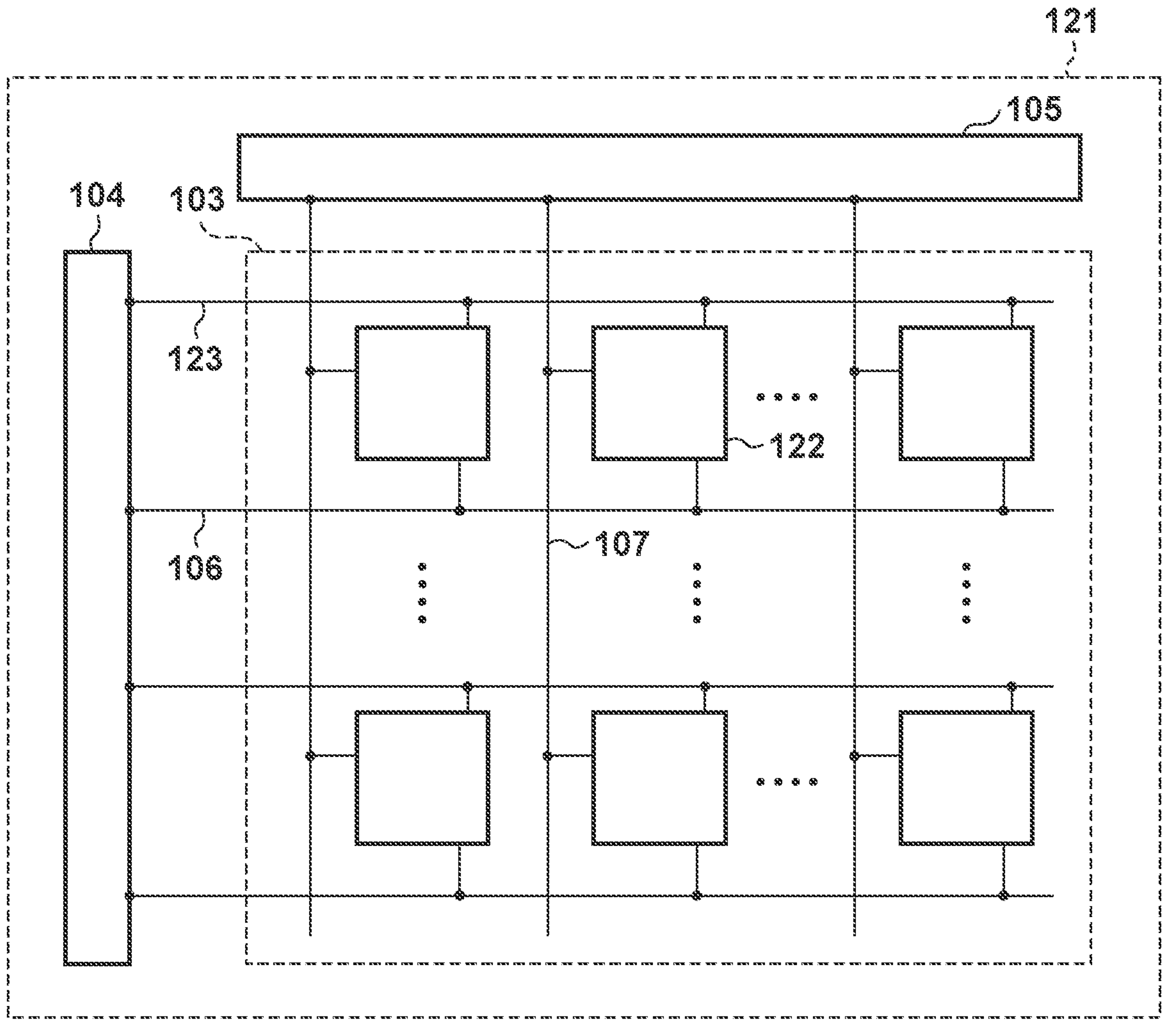
FIG. 5 is a view showing an example of the arrangement of a light emitting device according to the embodiment.
Figure 6:
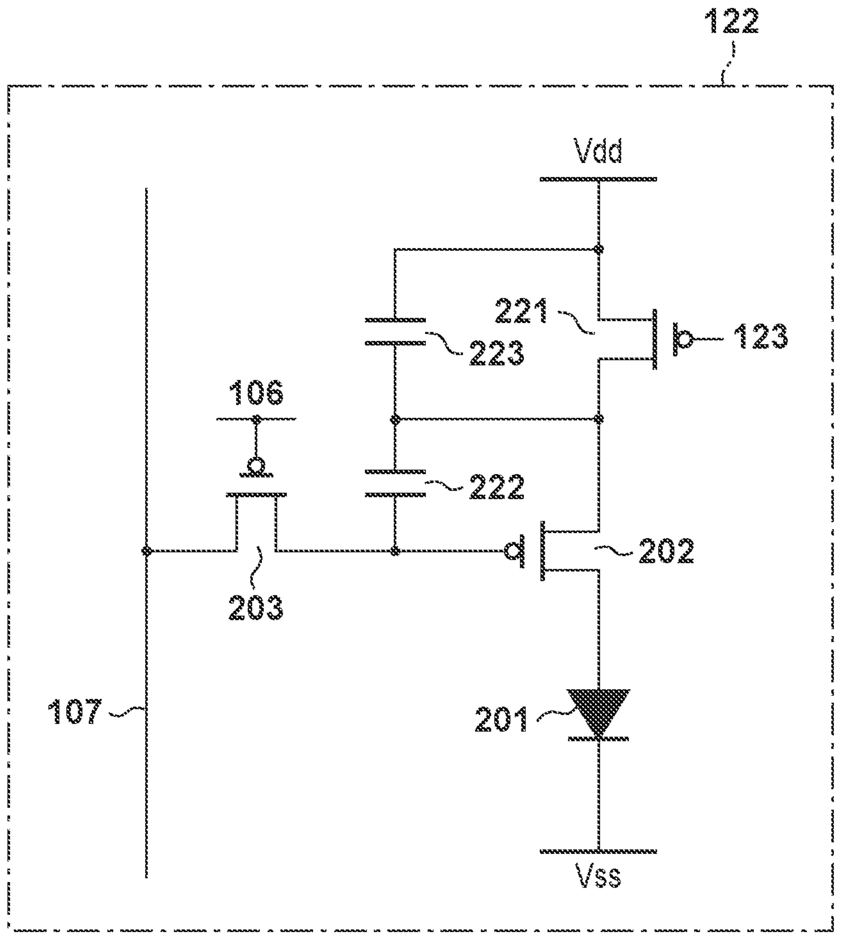
FIG. 6 is a circuit diagram showing an example of the arrangement of a pixel of the light emitting device shown in FIG. 5.

A modification of the light emitting device 101 described above with reference to FIGS. 1 to 4 will be described next with reference to FIGS. 5 to 8. FIG. 5 is a schematic view showing an example of the arrangement of a light emitting device 121 according to this embodiment. FIG. 6 is a circuit diagram showing an example of the arrangement of a pixel 122 arranged in the light emitting device 121.

In this embodiment, as compared with the pixel 102 of the above-described light emitting device 101, the pixel 122 of the light emitting device 121 further includes a light emission control transistor 221 arranged in a current path including the light emitting element 201 and the driving transistor 202 and configured to control light emission or non-light emission of the light emitting element 201. In addition to the components of the pixel array 103 of the light emitting device 101, a scanning line 123 for switching conduction/non-conduction of the light emission control transistor 221 is arranged in the pixel array 103 of the light emitting device 121. The pixel 122 further includes capacitive elements 222 and 223. The remaining components of the light emitting device 121 may be the same as those of the above-described light emitting device 101. Components of the light emitting device 121 of this embodiment, which are different from the above-described light emitting device 101, will mainly be described below.

As shown in FIG. 5, the scanning line 123 extending in the row direction is arranged in the pixel array 103 for each pixel row of the pixels 122 arranged in an array. Each scanning line 123 is connected to an output terminal of a corresponding pixel row of the vertical scanning circuit 104, and supplies a light emission control signal to each pixel 122.

As shown in FIG. 6, the light emission control transistor 221 is arranged between the driving transistor 202 and the power supply potential Vdd for supplying a driving current to the driving transistor 202. More specifically, one (the source region in the arrangement shown in FIG. 6) of diffusion regions respectively functioning as the source region and the drain region of the light emission control transistor 221 is connected to the power supply potential Vdd. The other (the drain region in the arrangement shown in FIG. 6) of the diffusion regions respectively functioning as the source region and the drain region of the light emission control transistor 221 is connected to one (the source region in the arrangement shown in FIG. 6) of the diffusion regions respectively functioning as the source region and the drain region of the driving transistor 202. The gate electrode of the light emission control transistor 221 is connected to the scanning line 123. However, the present invention is not limited to this, and for example, the light emission control transistor 221 may be arranged between the driving transistor 202 and the light emitting element 201.

The capacitive element 222 is connected between the gate electrode of the driving transistor 202 and one (the source region in the arrangement shown in FIG. 6) of the diffusion regions respectively functioning as the source region and the drain region of the driving transistor 202. The capacitive element 223 is connected between the power supply potential Vdd and one (the source region in the arrangement shown in FIG. 6) of the diffusion regions respectively functioning as the source region and the drain region of the driving transistor 202. The capacitive elements 222 and 223 may be parasitic capacitances of the driving transistor 202 and the light emission control transistor 221. Alternatively, the capacitive elements 222 and 223 may be elements each having the Metal-Insulator-Metal (MIM) structure.

In response to a light emission control signal applied from the vertical scanning circuit 104 to a control terminal via the scanning line 123, the light emission control transistor 221 is set in the conductive state to permit supply of a current from the power supply potential Vdd to the driving transistor 202. This allows the driving transistor 202 to drive the light emitting element 201. That is, the light emission control transistor 221 functions as a switch element for controlling light emission/non-light emission of the light emitting element 201 by controlling the conductive state of the current path in which the light emitting element 201 is arranged.

The switching operation of the light emission control transistor 221 can provide a period (non-light emission period) during which the light emitting element 201 is in a non-light emission state, and control the ratio between the non-light emission period and a light emission period during which the light emitting element 201 emits light (so-called duty control). The duty control can reduce afterimage blurring accompanying light emission of the light emitting element 201 of each pixel 122 over a period of one frame, thereby making it possible to further improve especially image quality of a moving image. By arranging the two capacitive elements 222 and 223, it is possible to keep the signal voltage of the gate electrode 301 of the driving transistor 202 more constant and suppress a luminance change, thereby implementing high-quality display. This embodiment does not inhibit the effect of suppression of the off-leakage current of the write transistor 203 and suppression of the variation of the write transistor 203, and thus high-quality display is maintained.

Figure 7:
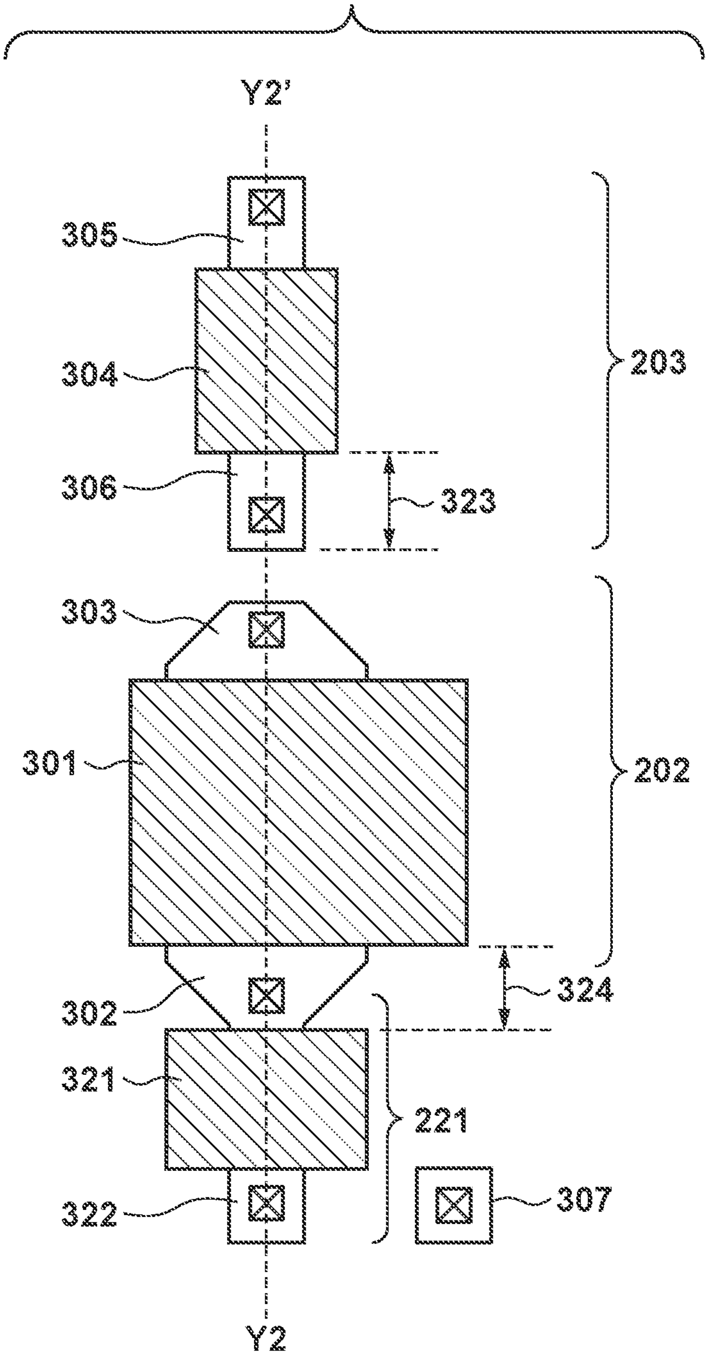
FIG. 7 is a plan view showing the example of the arrangement of the pixel of the light emitting device shown in FIG. 5.

The light emission control transistor 221 will be described in detail next with reference to FIGS. 7 and 8. FIG. 7 is a plan view showing the outline of the pixel 122, and FIG. 8 is a sectional view taken along a line Y2-Y2' shown in FIG. 7.

Figure 8:
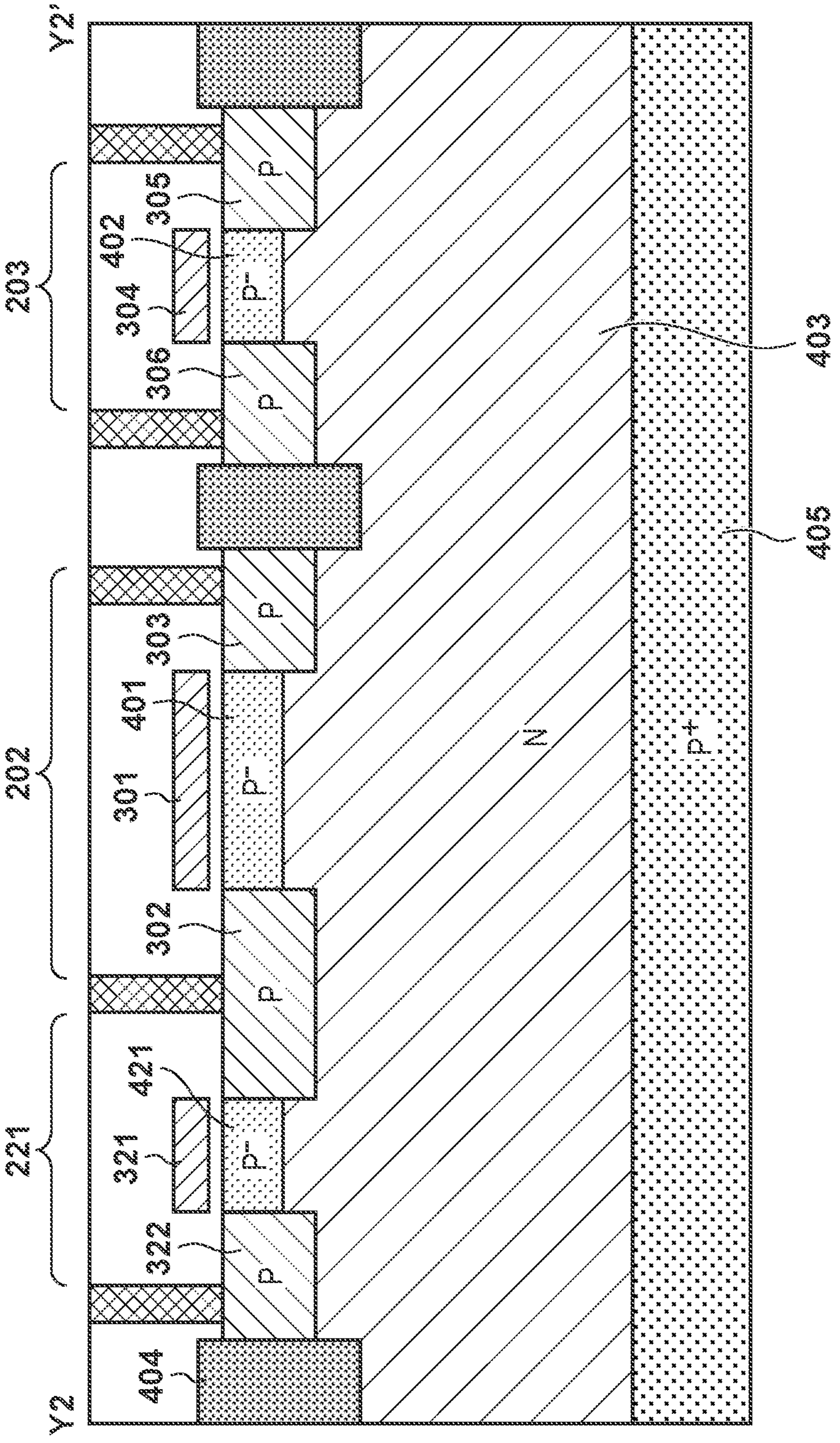
FIG. 8 is a sectional view showing the example of the arrangement of the pixel of the light emitting device shown in FIG. 5.

As shown in FIGS. 7 and 8, the light emission control transistor 221 includes an n-type gate electrode 321, and the p-type diffusion region 302 and a p-type diffusion region 322 respectively functioning as the source region and the drain region arranged in the current path including the light emitting element 201. In this embodiment, the diffusion region 302 is shared with the driving transistor 202. However, the present invention is not limited to this, and the diffusion regions of the driving transistor 202 and the light emission control transistor 221 may be independent of each other. The gate electrode 304 is connected to the scanning line 123, as described above.

In this embodiment, a length 323, in a current flowing direction, of the diffusion region 306 of the write transistor 203 connected to the gate electrode 301 of the driving transistor 202 is longer than a length 324, in a current flowing direction, of the diffusion region 302 shared by the driving transistor 202 and the light emission control transistor 221. As shown in FIG. 7, the length 323 in the current flowing direction of the diffusion region 306 may be defined as a length in the current flowing direction (the vertical direction in FIG. 7) from the end portion, on the side of the diffusion region 306, of the gate electrode 304 of the write transistor 203 to a portion where the polarities of the diffusion region 306 and the well 403 change, in orthogonal projection to a surface of the substrate 405 on which the write transistor 203 is arranged. Alternatively, the length 323 in the current flowing direction of the diffusion region 306 may be defined as a length in the current flowing direction from the end portion, on the side of the diffusion region 306, of the gate electrode 304 of the write transistor 203 to a portion where the impurity concentration of the diffusion region 306 becomes ½, ⅕, or ⅒, in orthogonal projection to the surface of the substrate 405 on which the write transistor 203 is arranged. Furthermore, the length 324 in the current flowing direction of the diffusion region 302 may be defined as a length in the current flowing direction (the vertical direction in FIG. 7) between the gate electrode 301 of the driving transistor 202 and the gate electrode 321 of the light emission control transistor 221, in orthogonal projection to a surface of the substrate 405 on which the driving transistor 202 and the light emission control transistor 221 are arranged.

By setting the length 323 longer than the length 324, the parasitic capacitance of the p-type diffusion region 306 increases, and thus the signal voltage written in the gate electrode 301 of the driving transistor 202 connected to the diffusion region 306 can be kept more constant. As a result, it is possible to suppress a luminance change, thereby implementing high-quality display.

As shown in FIG. 8, the impurity concentration of a channel region 421 of the light emission control transistor 221 may be substantially equal to that of the channel region 402 of the write transistor 203, that of the channel region 401 of the driving transistor 202, and that of the channel region of the transistor in the circuit of the driving circuit (for example, the vertical scanning circuit 104 and the signal output circuit 105) arranged on the periphery of the pixel array 103. That is, the impurity concentration of the light emission control transistor 221 may be lower than that of the well 403, together with the impurity concentration of the channel region 402 of the write transistor 203 and the impurity concentration of the channel region 401 of the driving transistor 202. As shown in FIG. 8, the channel region 401 of the driving transistor 202 may be a p-type buried channel, similar to the channel region 402 of the write transistor 203 and the channel region 401 of the driving transistor 202. This eliminates the need to increase the number of processes when forming each of the channel regions of the light emission control transistor 221, the write transistor 203, the driving transistor 202, and the transistor in the circuit of the driving circuit of the pixel array 103. If the light emission control transistor 221 has the same arrangement as that of the write transistor 203, it is possible to suppress a fluctuation of a current caused by RTS noise and the off-leakage current of the light emission control transistor 221.

Figure 9:
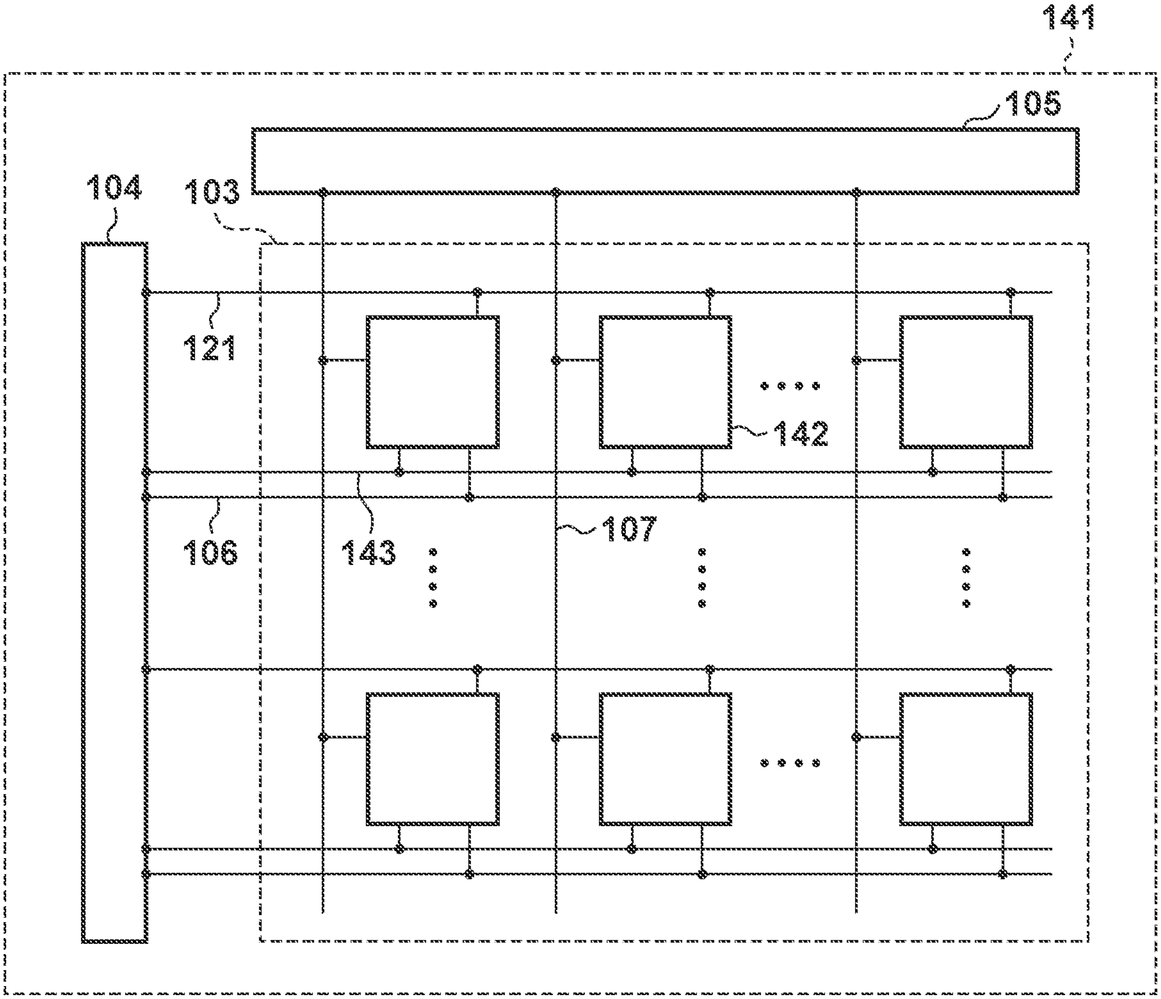
FIG. 9 is a view showing an example of the arrangement of a light emitting device according to the embodiment.
Figure 10:
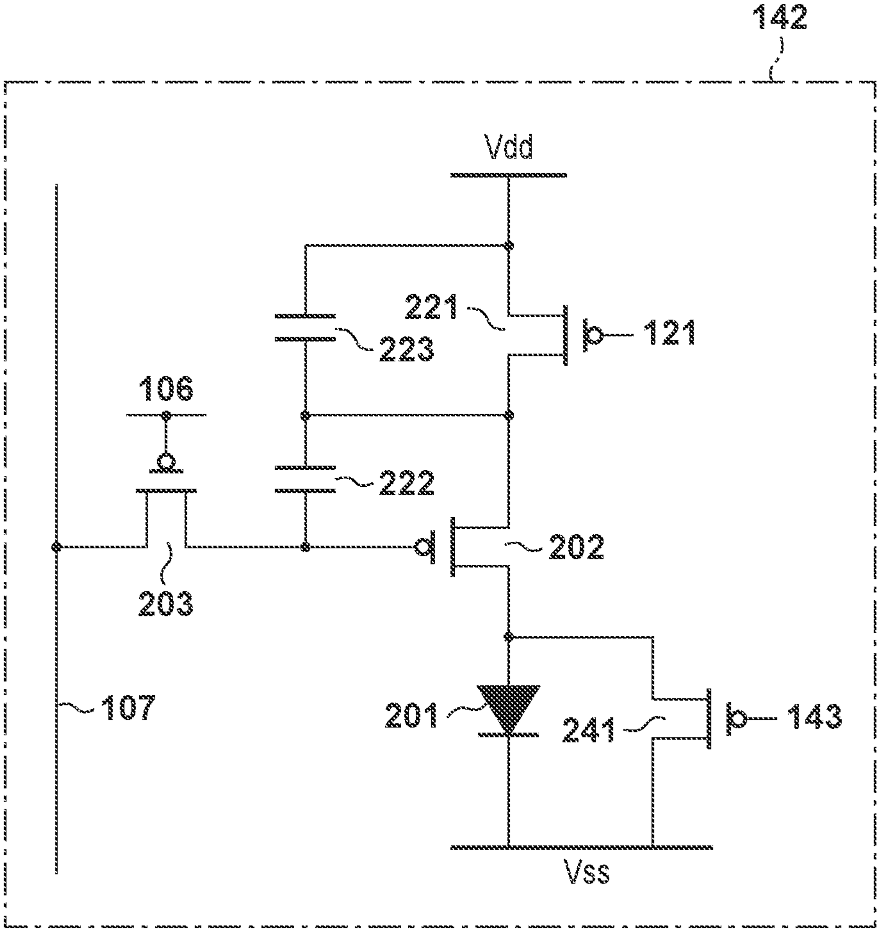
FIG. 10 is a circuit diagram showing an example of the arrangement of a pixel of the light emitting device shown in FIG. 9.

A modification of the above-described light emitting device 101 or 121 will be described next with reference to FIGS. 9 to 12. FIG. 9 is a schematic view showing an example of the arrangement of a light emitting device 141 according to this embodiment. FIG. 10 is a circuit diagram showing an example of the arrangement of a pixel 142 arranged in the light emitting device 141.

In this embodiment, as compared with the pixel 122 of the above-described light emitting device 121, the pixel 142 of the light emitting device 141 further includes a reset transistor 241 that short-circuits the two terminals of the light emitting element 201, in other words, that connects the anode of the light emitting element 201 to the power supply potential Vss. In addition to the components of the pixel array 103 of the light emitting device 121, a scanning line 143 for switching conduction/non-conduction of the reset transistor 241 is arranged in the pixel array 103 of the light emitting device 141. The remaining components may be the same as those of the above-described light emitting device 121. Components of the light emitting device 141 of this embodiment, which are different from the above-described light emitting device 121, will mainly be described below.

As shown in FIG. 9, the scanning line 143 extending in the row direction is arranged in the pixel array 103 for each pixel row of the pixels 142 arranged in an array. Each scanning line 143 is connected to an output terminal of a corresponding pixel row of the vertical scanning circuit 104, and supplies a reset signal to each pixel 142.

As shown in FIG. 10, one (the source region in the arrangement shown in FIG. 10) of diffusion regions respectively functioning as the source region and the drain region of the reset transistor 241 is connected to the anode of the light emitting element 201 and the other (the drain region in the arrangement shown in FIG. 10) of the diffusion regions respectively functioning as the source region and the drain region of the driving transistor 202. The other (the drain region in the arrangement shown in FIG. 10) of the diffusion regions respectively functioning as the source region and the drain region of the reset transistor 241 is connected to the power supply potential Vss. The gate electrode of the reset transistor 241 is connected to the scanning line 143.

During the non-light emission period of the pixel 142, if the reset transistor 241 is set in the conductive state, the anode of the light emitting element 201 is connected to the power supply potential Vss and the two terminals of the light emitting element 201 are short-circuited. This can set the light emitting element 201 in the non-light emission state (reset operation). By providing the reset transistor 241 in the pixel 142, the light emitting element 201 is caused to surely perform black display during the non-light emission period, thereby implementing the light emitting device 141 with a high contrast ratio. Note that this embodiment does not inhibit the effect of suppression of the off-leakage current of the write transistor 203 and suppression of the variation of the write transistor 203, and thus high-quality display is maintained.

Figure 11:
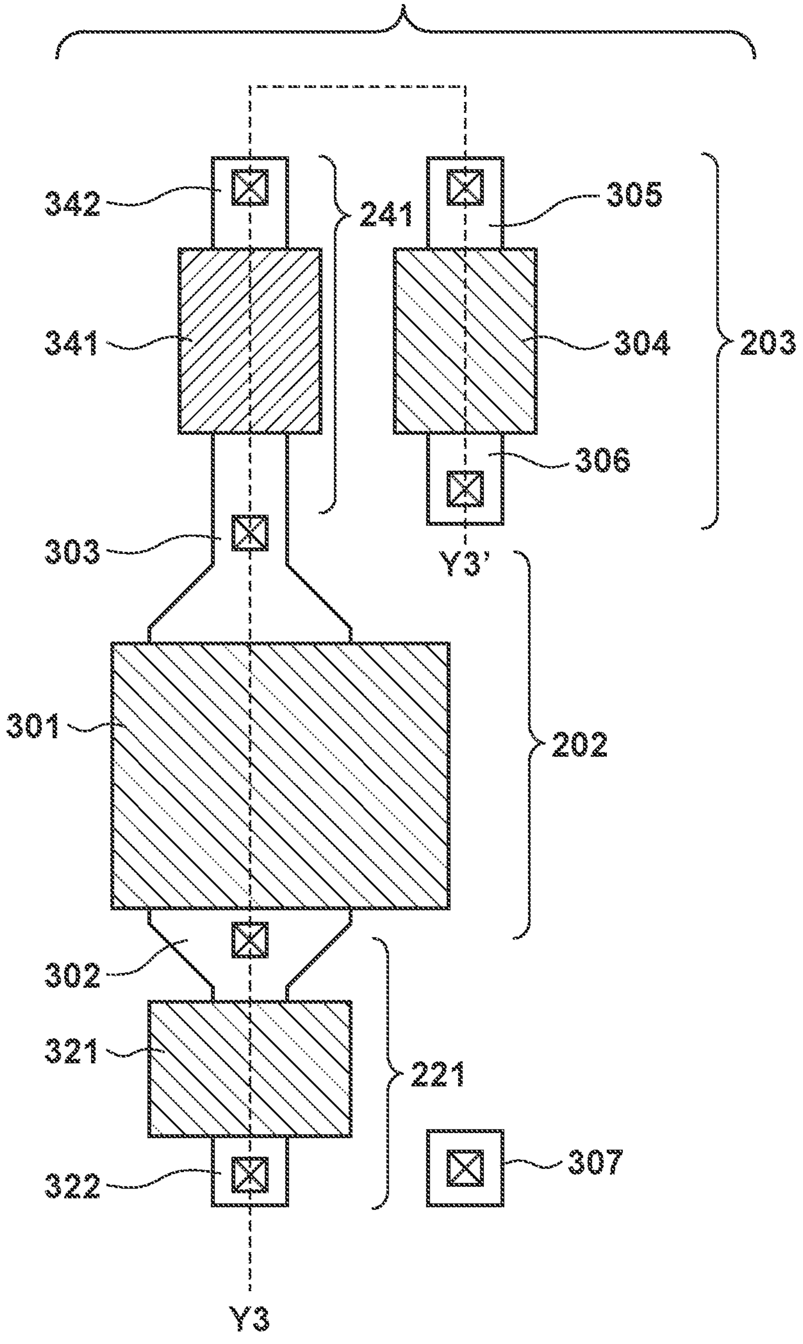
FIG. 11 is a plan view showing the example of the arrangement of the pixel of the light emitting device shown in FIG. 9.

The reset transistor 241 will be described in detail next with reference to FIGS. 11 and 12. FIG. 11 is a plan view showing the outline of the pixel 142, and FIG. 12 is a sectional view taken along a line Y3-Y3' shown in FIG. 11.

Figure 12:
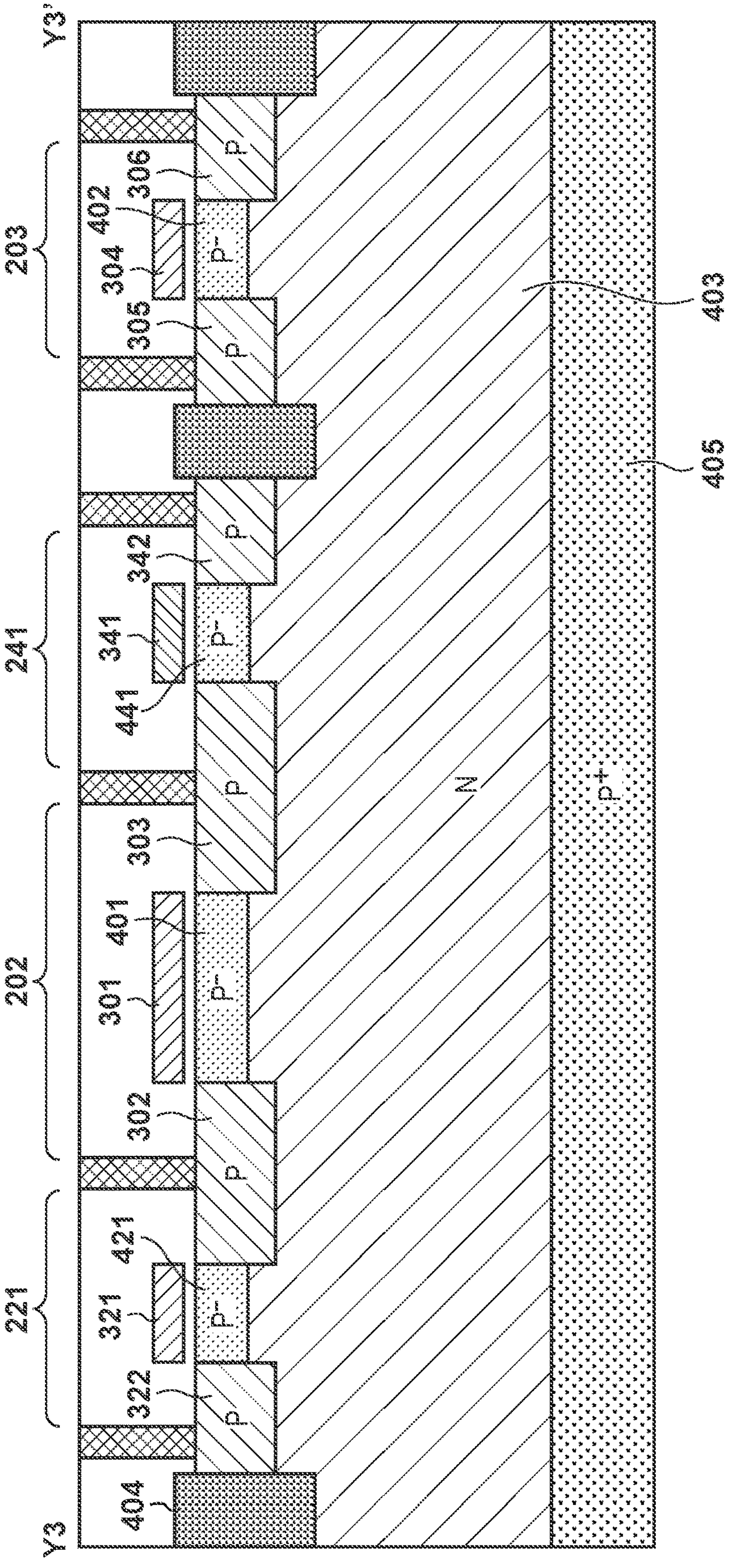
FIG. 12 is a sectional view showing the example of the arrangement of the pixel of the light emitting device shown in FIG. 9.

As shown in FIGS. 11 and 12, the reset transistor 241 includes a p-type gate electrode 341, and the p-type diffusion region 303 and a diffusion region 342 respectively functioning as the source region and the drain region. In this embodiment, the diffusion region 303 is shared with the driving transistor 202. However, the present invention is not limited to this, and the diffusion regions of the driving transistor 202 and the reset transistor 241 may be independent of each other. The gate electrode 304 is connected to the scanning line 143, as described above.

As shown in FIG. 12, the impurity concentration of a channel region 441 of the reset transistor 241 may be substantially equal to that of the channel region 402 of the write transistor 203, that of the channel region 401 of the driving transistor 202, that of the channel region 421 of the light emission control transistor 221, and that of the channel region of the transistor in the circuit of the driving circuit (for example, the vertical scanning circuit 104 and the signal output circuit 105) arranged on the periphery of the pixel array 103. That is, the impurity concentration of the reset transistor 241 may be lower than that of the well 403, together with the impurity concentration of the channel region 402 of the write transistor 203, the impurity concentration of the channel region 401 of the driving transistor 202, and the impurity concentration of the channel region 421 of the light emission control transistor 221. As shown in FIG. 12, the channel region 401 of the driving transistor 202 may be a p-type buried channel, similar to the channel region 402 of the write transistor 203 and the channel region

401 of the driving transistor 202. This eliminates the need to increase the number of processes when forming each of the channel regions of the reset transistor 241, the write transistor 203, the driving transistor 202, the light emission control transistor 221, and the transistor in the circuit of the driving circuit arranged on the periphery of the pixel array 103. If the reset transistor 241 has the same arrangement as that of the write transistor 203, it is possible to suppress a fluctuation of a current caused by RTS noise and the off-leakage current of the reset transistor 241.

As shown in FIG. 12, the conductivity type of the gate electrode 341 of the reset transistor 241 may be a p type different from the conductivity type of the gate electrode 304 of the write transistor 203. This can decrease the threshold voltage of the reset transistor 241, and suppress the potential of the anode of the light emitting element 201 from becoming higher than the power supply potential Vss at the time of the reset operation. If the pixel 142 includes the reset transistor 241, it is possible to cause the light emitting element 201 to transition to the non-light emission state more reliably, and the light emitting device 141 can implement high-quality display with higher contrast.

The organic EL element has been exemplified as the light emitting element 201 but the light emitting element 201 is not limited to this. The light emitting element 201 can be applied to the general light emitting device using a current-driven electro-optical element (light emitting element) whose light emission luminance changes in accordance with the value of a current flowing through the element, such as an inorganic EL element, an LED element, or a semiconductor laser element.

Application examples in which the light emitting device 101, 121, or 141 according to this embodiment is applied to a display device, a photoelectric conversion device, an electronic apparatus, an illumination device, a moving body, and a wearable device will be described here with reference to FIGS. 13 to 19A and 19B.

Figure 13:
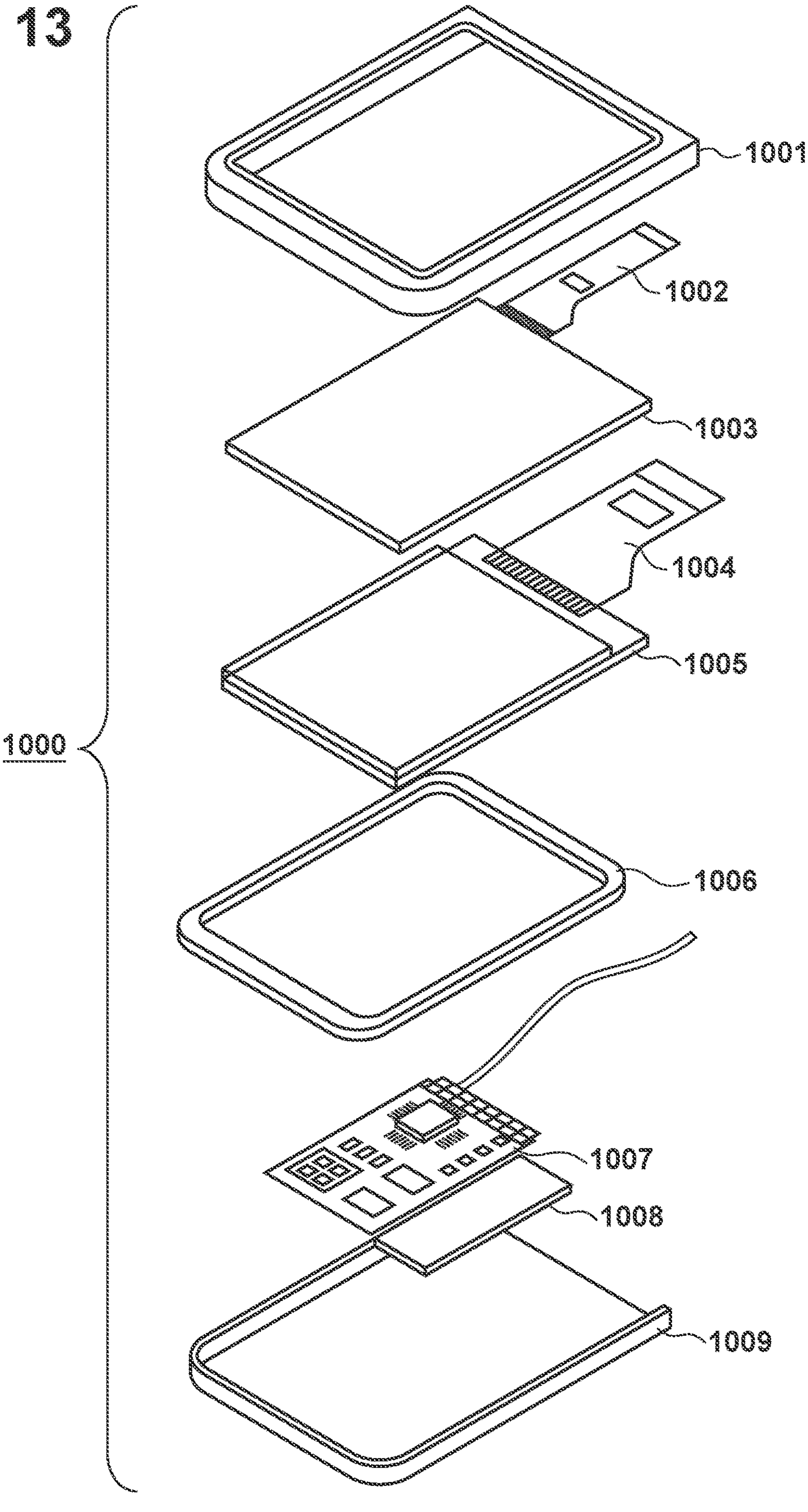
FIG. 13 is a view showing an example of a display device using the light emitting device according to the embodiment.

FIG. 13 is a schematic view showing an example of the display device using the light emitting device 101, 121, or 141 of this embodiment. A display device 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Active elements such as transistors are arranged on the circuit board 1007. The battery 1008 is unnecessary if the display device 1000 is not a portable apparatus. Even when the display device 1000 is a portable apparatus, the battery 1008 need not be provided at this position. The light emitting device 101, 121, or 141 according to this embodiment can be applied to the display panel 1005. The pixel array 103 of the light emitting device 101, 121, or 141 functioning as the display panel 1005 is connected to the active elements such as transistors arranged on the circuit board 1007 and operates.

The display device 1000 shown in FIG. 13 can be used for a display unit of a photoelectric conversion device (image capturing device) including an optical unit having a plurality of lenses, and an image sensor for receiving light having passed through the optical unit and photoelectrically converting the light into an electric signal. The photoelectric conversion device can include a display unit for displaying information acquired by the image sensor. In addition, the display unit can be either a display unit exposed outside the photoelectric conversion device, or a display unit arranged in the finder. The photoelectric conversion device can be a digital camera or a digital video camera.

Figure 14:
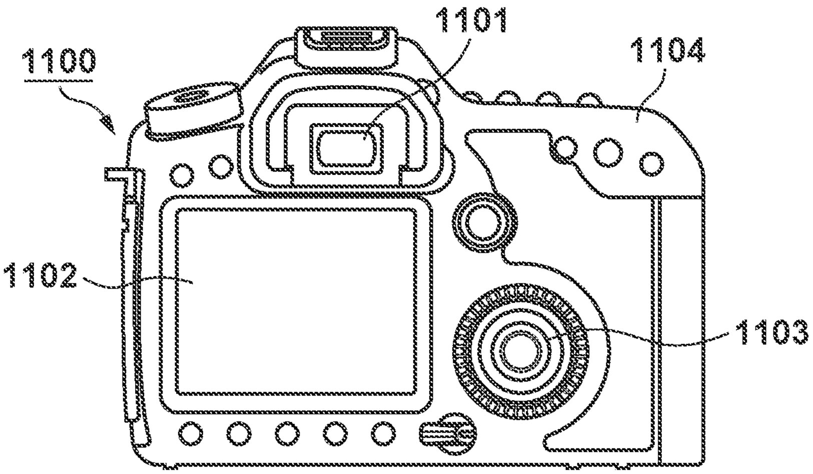
FIG. 14 is a view showing an example of a photoelectric conversion device using the light emitting device according to the embodiment.

FIG. 14 is a schematic view showing an example of the photoelectric conversion device using the light emitting device 101, 121, or 141 of this embodiment. A photoelectric conversion device 1100 can include a viewfinder 1101, a rear display 1102, an operation unit 1103, and a housing 1104. The photoelectric conversion device 1100 can also be called an image capturing device. The light emitting device 101, 121, or 141 according to this embodiment can be applied to the viewfinder 1101 or the rear display 1102 as a display unit. In this case, the light emitting device 101, 121, or 141 can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time in many cases, so the information should be displayed as soon as possible. Therefore, the light emitting device 101, 121, or 141 containing the organic light emitting material such as an organic EL element in the light emitting layer may be used for the viewfinder 1101 or the rear display 1102. This is so because the organic light emitting material has a high response speed. The light emitting device 101, 121, or 141 using the organic light emitting material can be used for the apparatuses that require a high display speed more suitably than for the liquid crystal display device.

The photoelectric conversion device 1100 includes an optical unit (not shown). This optical unit has a plurality of lenses, and forms an image on a photoelectric conversion element (not shown) that receives light having passed through the optical unit and is accommodated in the housing 1104. The focal points of the plurality of lenses can be adjusted by adjusting the relative positions. This operation can also automatically be performed.

The light emitting device 101, 121, or 141 may be applied to a display unit of an electronic apparatus. At this time, the display unit can have both a display function and an operation function. Examples of the portable terminal are a portable phone such as a smartphone, a tablet, and a head mounted display.

Figure 15:
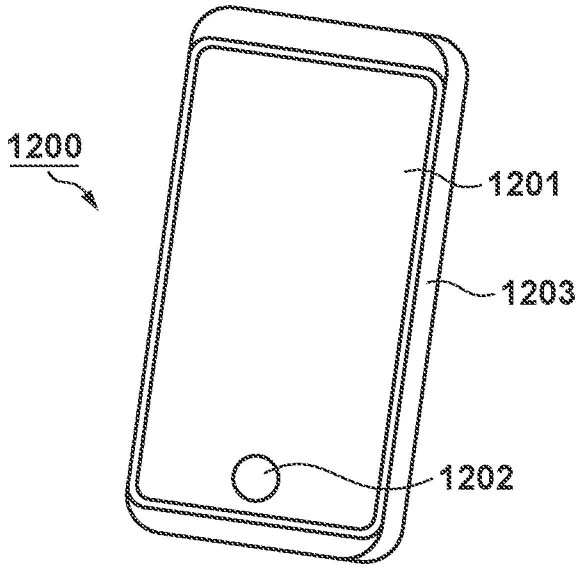
FIG. 15 is a view showing an example of an electronic apparatus using the light emitting device according to the embodiment.

FIG. 15 is a schematic view showing an example of an electronic apparatus using the light emitting device 101, 121, or 141 of this embodiment. An electronic apparatus 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit 1202 can also be a biometric authentication unit that performs unlocking or the like by authenticating the fingerprint. The portable apparatus including the communication unit can also be regarded as a communication apparatus. The light emitting device 101 according to this embodiment can be applied to the display unit 1201.

Figure 16A:
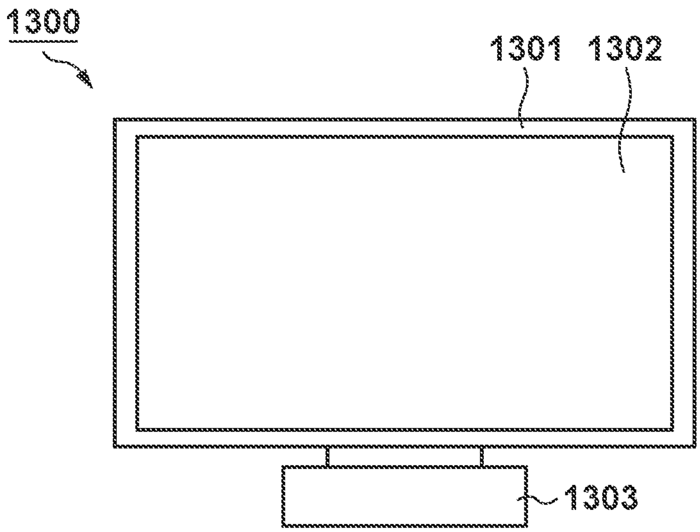
FIGS. 16A and 16B are views each showing an example of a display device using the light emitting device according to the embodiment.
Figure 16B:
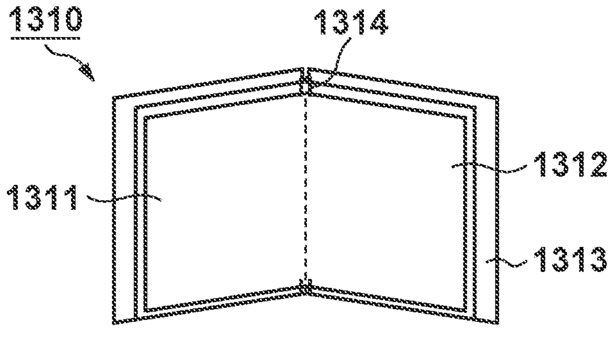

FIGS. 16A and 16B are schematic views showing examples of the display device using the light emitting device 101, 121, or 141 of this embodiment. FIG. 16A shows a display device such as a television monitor or a PC monitor. A display device 1300 includes a frame 1301 and a display unit 1302. The light emitting device 101, 121, or 141 according to this embodiment can be applied to the display unit 1302. The display device 1300 can include a base 1303 that supports the frame 1301 and the display unit 1302. The base 1303 is not limited to the form shown in FIG.

16A. For example, the lower side of the frame 1301 may also function as the base 1303. In addition, the frame 1301 and the display unit 1302 can be bent. The radius of curvature in this case can be 5,000 mm (inclusive) to 6,000 mm (inclusive).

FIG. 16B is a schematic view showing another example of the display device using the light emitting device 101, 121, or 141 of this embodiment. A display device 1310 shown in FIG. 16B can be folded, and is a so-called foldable display device. The display device 1310 includes a first display unit 1311, a second display unit 1312, a housing 1313, and a bending point 1314. The light emitting device 101, 121, or 141 according to this embodiment can be applied to each of the first display unit 1311 and the second display unit 1312. The first display unit 1311 and the second display unit 1312 can also be one seamless display device. The first display unit 1311 and the second display unit 1312 can be divided by the bending point. The first display unit 1311 and the second display unit 1312 can display different images, and can also display one image together.

Figure 17:
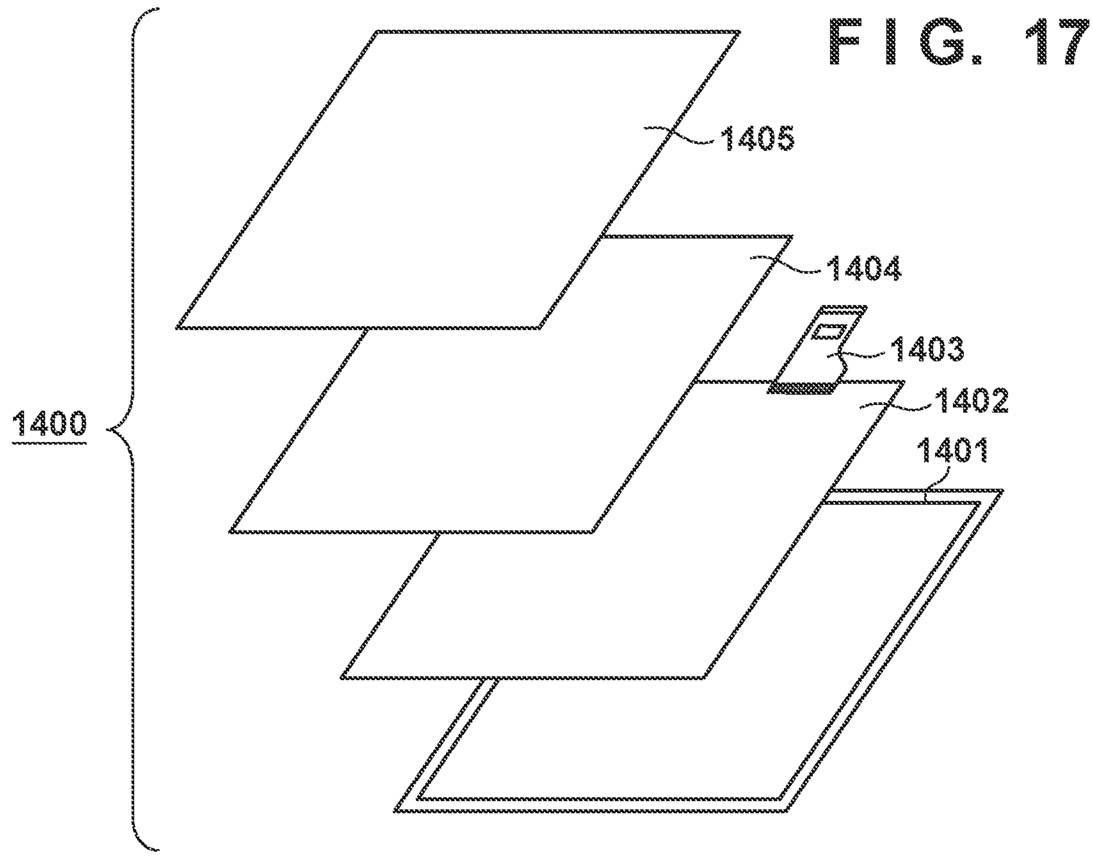
FIG. 17 is a view showing an example of an illumination device using the light emitting device according to the embodiment.

FIG. 17 is a schematic view showing an example of the illumination device using the light emitting device 101, 121, or 141 of this embodiment. An illumination device 1400 can include a housing 1401, a light source 1402, a circuit board 1403, an optical film 1404, and a light diffusing unit 1405. The light emitting device 101, 121, or 141 according to this embodiment can be applied to the light source 1402. The optical film 1404 can be a filter that improves the color rendering of the light source. When performing lighting-up or the like, the light diffusing unit 1405 can throw the light of the light source over a broad range by effectively diffusing the light. The illumination device can also include a cover on the outermost portion, as needed. The illumination device 1400 can include both or one of the optical film 1404 and the light diffusing unit 1405.

The illumination device 1400 is, for example, a device for illuminating the interior of the room. The illumination device 1400 can emit white light, natural white light, or light of any color from blue to red. The illumination device 1400 can also include a light control circuit for controlling these light components. The illumination device 1400 can also include a power supply circuit connected to the light emitting device 101, 121, or 141 functioning as the light source 1402. The power supply circuit is a circuit for converting an AC voltage into a DC voltage. White has a color temperature of 4,200 K, and natural white has a color temperature of 5,000 K. The illumination device 1400 may also include a color filter. In addition, the illumination device 1400 can include a heat radiation unit. The heat radiation unit radiates the internal heat of the device to the outside of the device, and examples are a metal having a high specific heat and liquid silicon.

Figure 18:
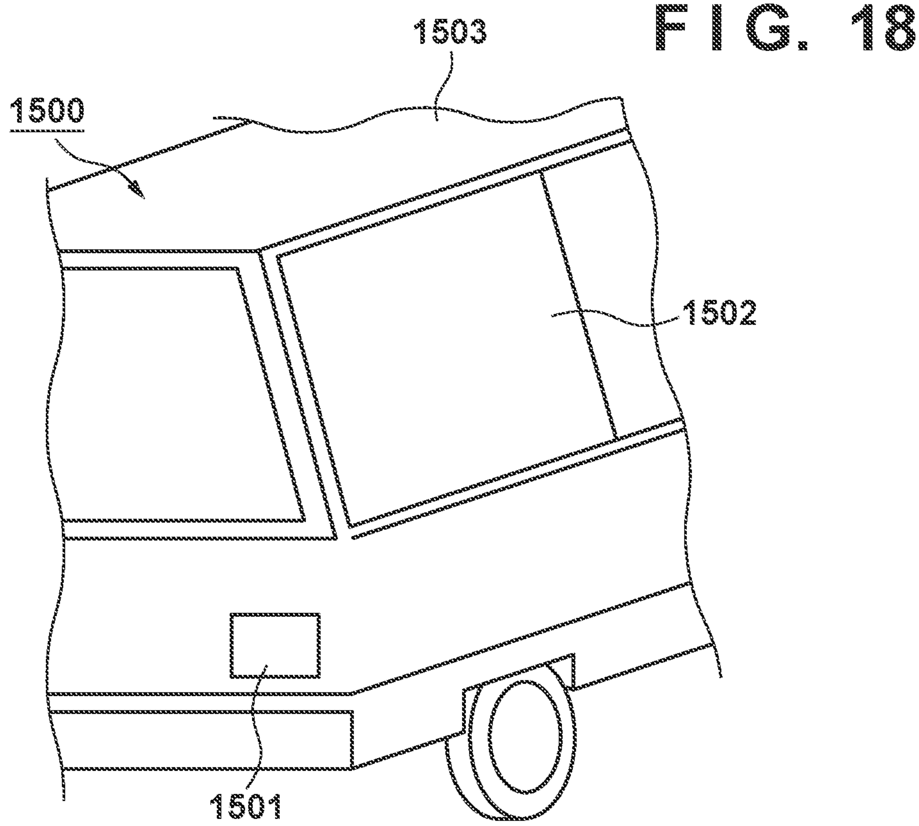
FIG. 18 is a view showing an example of a moving body using the light emitting device according to the embodiment.

FIG. 18 is a schematic view of an automobile having a taillight as an example of a vehicle lighting appliance using the light emitting device 101, 121, or 141 of this embodiment. An automobile 1500 has a taillight 1501, and can have a form in which the taillight 1501 is turned on when performing a braking operation or the like. The light emitting device 101, 121, or 141 of this embodiment can be used as a headlight serving as a vehicle lighting appliance. The automobile is an example of a moving body, and the moving body may be a ship, a drone, an aircraft, a railroad car, an industrial robot, or the like. The moving body may include a main body and a lighting appliance provided in the main body. The lighting appliance may be used to make a notification of the current position of the main body.

The light emitting device 101, 121, or 141 according to this embodiment can be applied to the taillight 1501. The taillight 1501 can include a protection member for protecting the light emitting device 101, 121, or 141 functioning as the taillight 1501. The material of the protection member is not limited as long as the material is a transparent material with a strength that is high to some extent, and an example is polycarbonate. The protection member may be made of a material obtained by mixing a furandicarboxylic acid derivative, an acrylonitrile derivative, or the like in polycarbonate.

The automobile 1500 can include a vehicle body 1503, and a window 1502 attached to the vehicle body 1503. This window can be a window for checking the front and back of the automobile, and can also be a transparent display. For this transparent display, the light emitting device 101, 121, or 141 according to this embodiment may be used. In this case, the constituent materials of the electrodes and the like of the light emitting device 101, 121, or 141 are formed by transparent members.

Figure 19A:
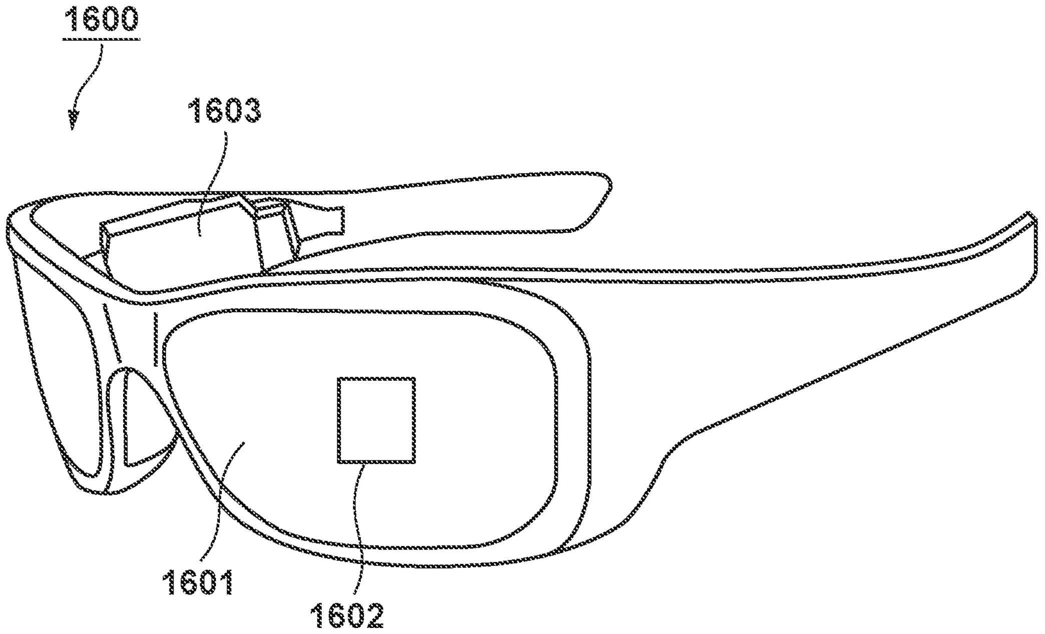
FIGS. 19A and 19B are views each showing an example of a wearable device using the light emitting device according to the embodiment.
Figure 19B:
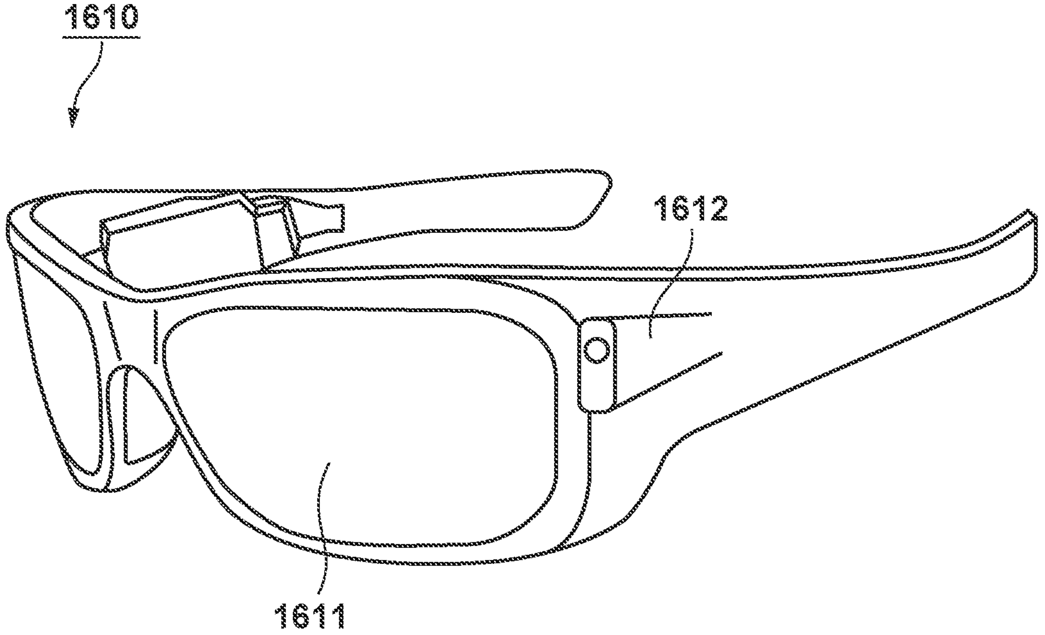

Further application examples of the light emitting device 101, 121, or 141 according to this embodiment will be described with reference to FIGS. 19A and 19B. The light emitting device 101, 121, or 141 can be applied to a system that can be worn as a wearable device such as smartglasses, a Head Mounted Display (HMD), or a smart contact lens. An image capturing display device used for such application examples includes an image capturing device capable of photoelectrically converting visible light and a light emitting device capable of emitting visible light.

Glasses 1600 (smartglasses) according to one application example will be described with reference to FIG. 19A. An image capturing device 1602 such as a CMOS sensor or an SPAD is provided on the surface side of a lens 1601 of the glasses 1600. In addition, the light emitting device 101, 121, or 141 according to this embodiment is provided on the back surface side of the lens 1601.

The glasses 1600 further include a control device 1603. The control device 1603 functions as a power supply that supplies electric power to the image capturing device 1602 and the light emitting device 101, 121, or 141 according to each embodiment. In addition, the control device 1603 controls the operations of the image capturing device 1602 and the light emitting device 101, 121, or 141. An optical system configured to condense light to the image capturing device 1602 is formed on the lens 1601.

Glasses 1610 (smartglasses) according to one application example will be described with reference to FIG. 19B. The glasses 1610 include a control device 1612, and an image capturing device corresponding to the image capturing device 1602 and the light emitting device 101, 121, or 141 are mounted on the control device 1612. The image capturing device in the control device 1612 and an optical system configured to project light emitted from the light emitting device 101, 121, or 141 are formed in a lens 1611, and an image is projected to the lens 1611. The control device 1612 functions as a power supply that supplies electric power to the image capturing device and the light emitting device 101, 121, or 141, and controls the operations of the image capturing device and the light emitting device 101, 121, or 141. The control device 1612 may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball.

A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The light emitting device 101, 121, or 141 according to the embodiment of the present invention can include an image capturing device including a light receiving element, and control a displayed image based on the line-of-sight information of the user from the image capturing device.

More specifically, the light emitting device 101, 121, or 141 decides a first visual field region at which the user is gazing and a second visual field region other than the first visual field region based on the line-of-sight information. The first visual field region and the second visual field region may be decided by the control device of the light emitting device 101, 121, or 141, or those decided by an external control device may be received. In the display region of the light emitting device 101, 121, or 141, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first display region and the second display region may be decided by the control device of the light emitting device 101, 121, or 141, or those decided by an external control device may be received. The resolution of the region of higher priority may be controlled to be higher than the resolution of the region other than the region of higher priority. That is, the resolution of the region of relatively low priority may be low.

Note that AI may be used to decide the first visual field region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the light emitting device 101, 121, or 141, the image capturing device, or an external device. If the external device holds the AI program, it is transmitted to the light emitting device 101, 121, or 141 via communication.

When performing display control based on line-of-sight detection, smartglasses further including an image capturing device configured to capture the outside can be applied. The smartglasses can display captured outside information in real time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070269, filed Apr. 21, 2022, which is hereby incorporated by reference herein in its entirety.

What is claimed is:

1. A light emitting device in which a pixel is arranged, the pixel comprising (1) a light emitting element, (2) a first transistor configured to supply, to the light emitting element, a current corresponding to a luminance signal, and (3) a second transistor configured to supply the luminance signal to a gate electrode of the first transistor, wherein diffusion regions respectively functioning as a source region and a drain region of the second transistor are of a first conductivity type, wherein a gate electrode of the second transistor is of a second conductivity type opposite to the first conductivity type, wherein the first transistor and the second transistor are arranged in a well of the second conductivity type, and wherein an impurity concentration of a channel region of the second transistor is lower than an impurity concentration of the well.

2. The device according to claim 1, wherein an impurity concentration of a channel region of the first transistor is equal to the impurity concentration of the channel region of the second transistor.

3. The device according to claim 2, wherein the channel region of the first transistor and the channel region of the second transistor are of the first conductivity type.

4. The device according to claim 3, wherein diffusion regions respectively functioning as a source region and a drain region of the first transistor are of the first conductivity type, and wherein the gate electrode of the first transistor is of the second conductivity type.

5. The device according to claim 1, wherein the channel region of the second transistor is of the first conductivity type.

6. The device according to claim 5, wherein the light emitting device comprises (1) a pixel array in which a plurality of pixels including the pixel are arranged, and (2) a peripheral region in which a driving circuit configured to operate the plurality of pixels is arranged, wherein a third transistor having a channel region of the first conductivity type is arranged in the peripheral region, and wherein the impurity concentration of the channel region of the second transistor is equal to an impurity concentration of the channel region of the third transistor.

7. The device according to claim 1, wherein the pixel further comprises another transistor, the another transistor being arranged in a current path including the light emitting element and the first transistor, and being configured to control light emission or non-light emission of the light emitting element.

8. The device according to claim 7, wherein one of a source region and a drain region of the first transistor and another of a source region and a drain region of the another transistor share one diffusion region, and wherein a length, in a current flowing direction, of the diffusion region of the second transistor connected to the gate electrode of the first transistor is longer than a length, in a current flowing direction, of the diffusion region shared by the first transistor and the another transistor.

9. The device according to claim 7, wherein the impurity concentration of the channel region of the second transistor is equal to an impurity concentration of a channel region of the another transistor.

10. The device according to claim 9, wherein the channel region of the second transistor and the channel region of the another transistor are of the first conductivity type.

11. The device according to claim 10, wherein diffusion regions respectively functioning as a source region and a drain region of the another transistor are of the first conductivity type, and wherein a gate electrode of the another transistor is of the second conductivity type.

12. The device according to claim 1, wherein the pixel further comprises another transistor, the another transistor being configured to short-circuit two terminals of the light emitting element, and wherein the impurity concentration of the channel region of the second transistor is equal to an impurity concentration of a channel region of the another transistor.

13. The device according to claim 12, wherein the channel region of the second transistor and the channel region of the another transistor are of the first conductivity type.

14. The device according to claim 13, wherein diffusion regions respectively functioning as a source region and a drain region of the another transistor are of the first conductivity type, and wherein a gate electrode of the another transistor is of the first conductivity type.

15. A display device comprising the light emitting device according to claim 1, and an active element connected to the light emitting device.

16. A photoelectric conversion device comprising an optical unit including a plurality of lenses, an image sensor configured to receive light having passed through the optical unit, and a display unit configured to display an image, wherein the display unit displays an image captured by the image sensor, and includes the light emitting device according to claim 1.

17. An electronic apparatus comprising a housing provided with a display unit, and a communication unit provided in the housing and configured to perform external communication, wherein the display unit includes the light emitting device according to claim 1.

18. An illumination device comprising a light source, and at least one of a light diffusing unit and an optical film, wherein the light source includes the light emitting device according to claim 1.

19. A moving body comprising a main body, and a lighting appliance provided in the main body, wherein the lighting appliance includes the light emitting device according to claim 1.

20. A light emitting device in which a pixel is arranged, the pixel comprising (1) a light emitting element, (2) a first transistor configured to supply, to the light emitting element, a current corresponding to a luminance signal, (3) a second transistor configured to supply the luminance signal to a gate electrode of the first transistor, and (4) a third transistor configured to short-circuit two terminals of the light emitting element, wherein diffusion regions respectively functioning as a source region and a drain region of the second transistor are of a first conductivity type, wherein a gate electrode of the second transistor is of a second conductivity type opposite to the first conductivity type, wherein diffusion regions respectively functioning as a source region and a drain region of the third transistor are of the first conductivity type, and wherein a gate electrode of the third transistor is of the first conductivity type.

21. The device according to claim 20, wherein diffusion regions respectively functioning as a source region and a drain region of the first transistor are of the first conductivity type, and wherein the gate electrode of the first transistor is of the second conductivity type.

22. The device according to claim 20, wherein the light emitting device comprises a pixel array in which a plurality of pixels including the pixel are arranged, and a peripheral region in which a driving circuit configured to operate the plurality of pixels is arranged, wherein a fourth transistor having a channel region of the first conductivity type is arranged in the peripheral region, and wherein the impurity concentration of the channel region of the second transistor is equal to an impurity concentration of the channel region of the fourth transistor.

23. The device according to claim 20, wherein the pixel further comprises another transistor, the another transistor being arranged in a current path including the light emitting element and the first transistor, and being configured to control light emission or non-light emission of the light emitting element.

24. The device according to claim 23, wherein one of a source region and a drain region of the first transistor and another of a source region and a drain region of the another transistor share one diffusion region, and wherein a length, in a current flowing direction, of the diffusion region of the second transistor connected to the gate electrode of the first transistor is longer than a length, in a current flowing direction, of the diffusion region shared by the first transistor and the another transistor.

25. The device according to claim 23, wherein the impurity concentration of the channel region of the second transistor is equal to an impurity concentration of a channel region of the another transistor.

26. The device according to claim 25, wherein the channel region of the second transistor and the channel region of the another transistor are of the first conductivity type.

27. The device according to claim 26, wherein diffusion regions respectively functioning as a source region and a drain region of the another transistor are of the first conductivity type, and wherein a gate electrode of the another transistor is of the second conductivity type.

28. The device according to claim 20, wherein the impurity concentration of the channel region of the second transistor is equal to an impurity concentration of a channel region of the third transistor.

29. The device according to claim 28, wherein the channel region of the second transistor and the channel region of the third transistor are of the first conductivity type.

30. A display device comprising the light emitting device according to claim 20, and an active element connected to the light emitting device.

31. An electronic apparatus comprising a housing provided with a display unit, and a communication unit provided in the housing and configured to perform external communication, wherein the display unit includes the light emitting device according to claim 20.

* * * * *